Sept. 8, 1959 W. J. REYNOLDS 2,903,216
GROSS WEIGHING HEAD FOR PRODUCE BAGGING MACHINE
Filed Feb. 4, 1957 2 Sheets-Sheet 1
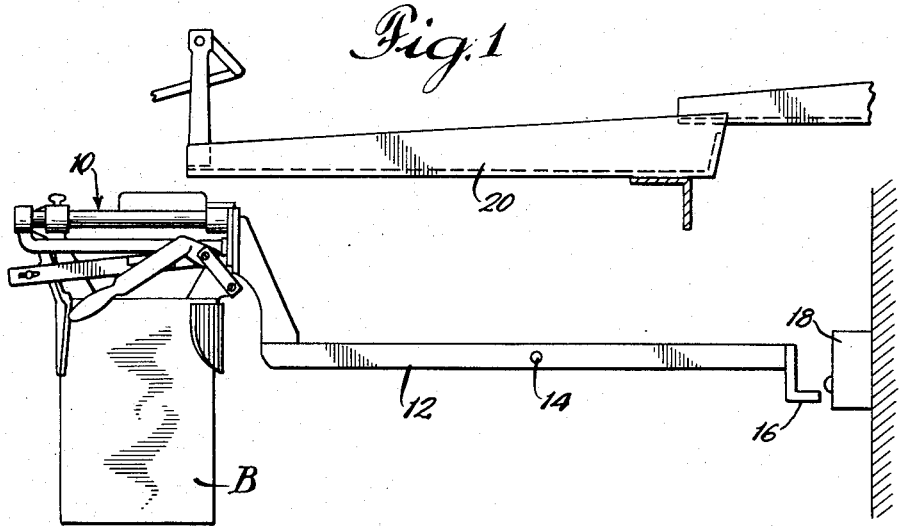
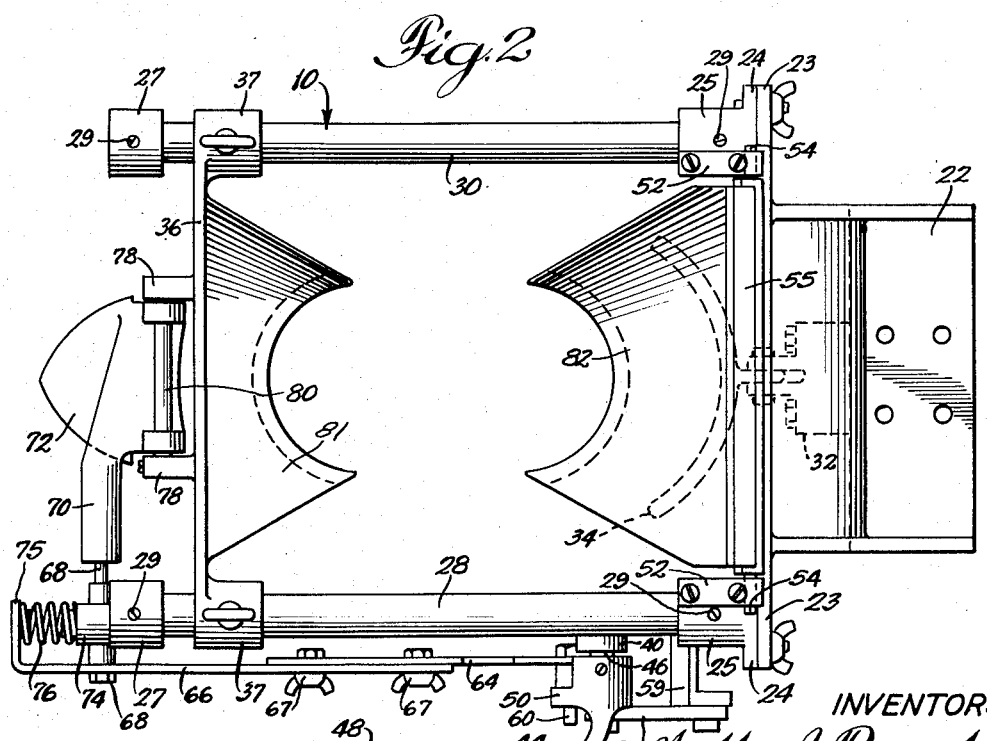
INVENTOR:
Walter J. Reynolds,
BY Bair, Freeman & Molinare
ATTORNEYS.

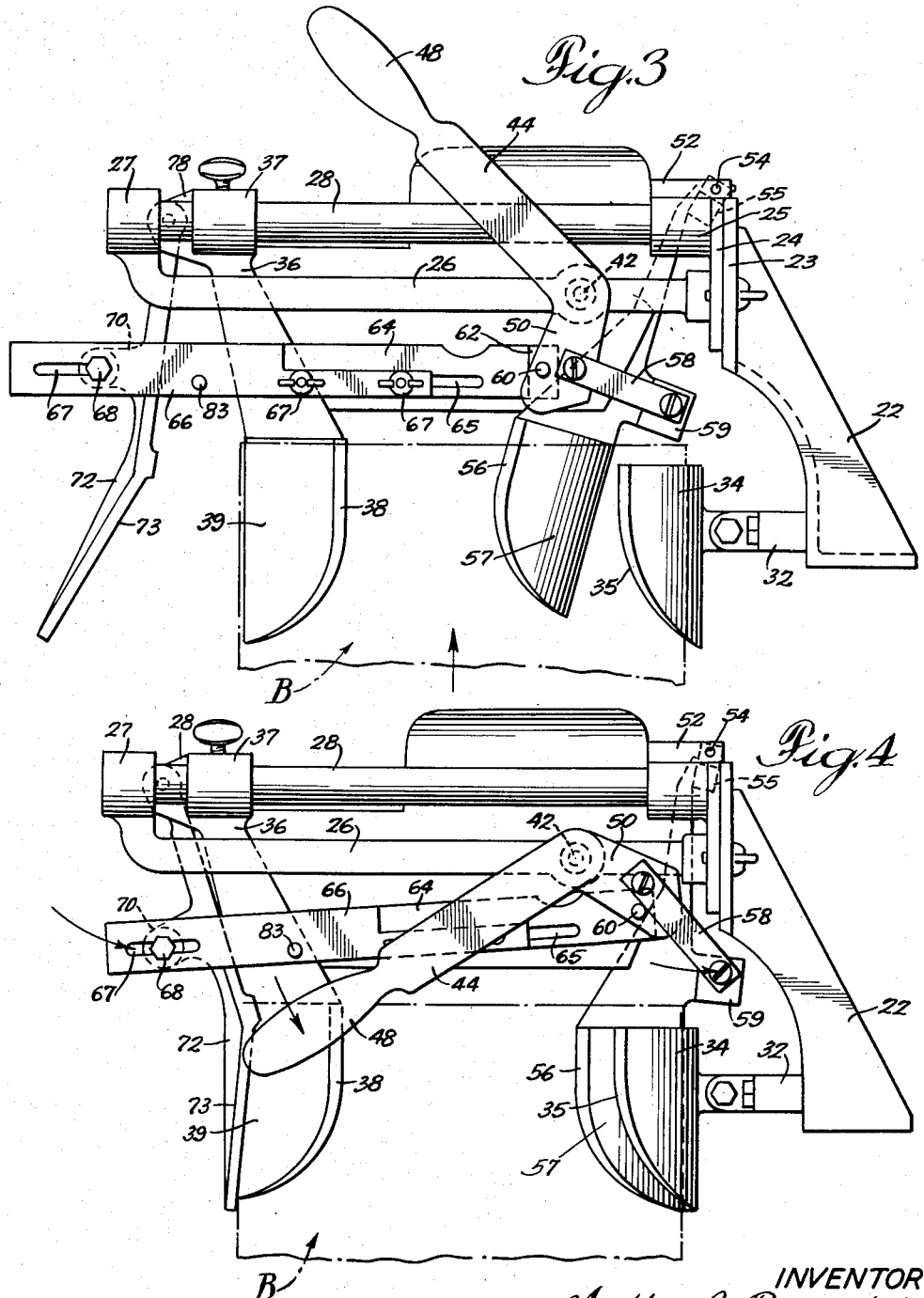

United States Patent Office 2,903,216
Patented Sept. 8, 1959

2,903,216

GROSS WEIGHING HEAD FOR PRODUCE BAGGING MACHINE

Walter J. Reynolds, Anderson, Ind., assignor to Lynch Corporation, a corporation of Indiana Application February 4, 1957, Serial No. 637,951

7 Claims. (Cl. 248—101)

This invention relates generally to a gross weighing head for a produce bagging machine or the like, and more particularly to an improved gross weighing head construction having novel means for grippingly engaging produce-receiving bags or the like during a combined filling and weighing operation.

It is a primary object of this invention to provide a unitary gross weighing head having releasable gripping means for securing a produce-receiving bag in a predetermined position upon a scale beam, whereby a combined filling and gross weighing operation may be performed as the bag is releasably held.

It is another object of this invention to provide a device of the type aforesaid having novel manually-operable locking and releasing means to enable rapid and secure gripping of empty produce-receiving bags in fully-open position for filling and weighing, and to enable quick release of such bags for removal when filled.

It is a further object of this invention to provide a device of the type aforesaid which is capable of quick and simple adjustment to accommodate bags of various sizes.

It is still another object of this invention to provide gripping means of the type aforesaid for releasably holding the produce-receiving bag during filling, and which operates to efficiently and securely hold bags of various materials including paper, mesh, fabric and plastic, without the necessity for any adjustment or change of parts.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

Figure 1 is a diagrammatic representation showing the gross weighing head of the present invention mounted in operative relation on the scale beam of an automatic produce bagging machine;

Figure 2 is a top plan view of the gross weighing head;

Figure 3 is a side elevational view of the gross weighing head, showing the bag-gripping pads in open relation; and Figure 4 is a view similar to Figure 3 showing the bag-gripping pads in closed relation.

Referring now more particularly to the drawing, I have indicated at 10 a gross weighing head unit constructed in accordance with the principles and features of the present invention. In Figure 1, the head 10 is shown in mounted relation on the scale beam 12 of an automatic produce bagging machine. It will be understood that the scale beam 12 may form a portion of either a manual or automatic produce bagging machine. For example, the gross weighing head 10 of the present invention may be substituted for the net weighing scale bucket and related structure of an automatic machine such as I have disclosed in my copending application, Serial No. 501,898, filed April 18, 1955, allowed September 19, 1956, now Pat. No. 2, 787,436.

For purposes of illustration, I have indicated in more or less diagrammatic manner the structural elements of the scale mechanism. A fulcrum 14, fixedly secured to a machine frame, provides a pivot point for weighing movement. Actuator means 16, carried at the end of the scale beam opposite the head 10, cooperates with a switch device 18 for automatically regulating various material feeding operations in accordance with a predetermined weighing cycle. A vibratory feeder or the like 20 may be controlled by the switch 18 to effect introduction of material to the weighing head 10 in an intermittent manner.

Referring now more particularly to Figures 2, 3 and 4 of the drawing, the structure of the head 10 will be described in detail. A main unit-supporting bracket 22 is provided for removable attachment of the entire head unit 10 to the scale beam 12. A pair of rod mounting plates 24, having first support blocks 25 extending therefrom, are removably carried at opposite sides of the main bracket 22 by an upstanding flange portion 23 thereof and suitable bolt and lock nut assemblies. A pair of elongated brackets 26, terminating in second support blocks 27, also extend from the plates 24. The blocks 25 and 27 are disposed in opposite spaced alignment, and serve to provide bores for receiving a pair of mounting rods 28 and 30 in parallel spaced relation. Suitable lock screws 29 in the blocks 25 and 27 serve to fixedly secure the rods 28 and 30 in their mounted positions.

The main bracket 22 carries a stationary supporting block 32 adjacent its lower end. The block 32 serves to removably mount a rear stationary bag locking unit 34. A bag gripping pad 35 is provided by the unit 34. The pad 35 is of generally arcuate shape in horizontal cross section and is downwardly tapered.

An adjustable supporting bracket 36 having mounting blocks 37 at its opposite sides is slidably carried by the mounting rods 28 and 30. Suitable lock screws are provided on the blocks 37 for fixedly positioning the bracket 36 in predetermined position along the lengths of the rods 28 and 30 relative to the fixed location of the rear stationary bag locking unit 34. A forward adjustable bag holding unit 38 is carried by the adjustable supporting bracket 36. It will be apparent that the unit 38 may be positioned relative to the unit 34 for accommodating bags or receptacles having various size widths or openings. The unit 38 provides a gripping pad 39, substantially the reverse in form and contour as the pad 35 and somewhat larger in size.

The mounting rod 28 provides a transverse boss or mounting block 40 having a horizontal bore for receiving a pivot shaft 42. A bag locking handle 44 is mounted on the shaft 42, and nylon bushings 46 are provided to insure smooth rotary movement. A manual gripping knob 48 is provided at one end of the handle 44 and a crank portion 50 extends beyond the boss 40 at the other end.

A pair of mounting blocks 52 are bolted to the blocks 25, and provide horizontal bores for rotatably receiving the pivot pins 54 of a pivot bracket 55. A rear bag holding unit 56 is carried by the bracket 55 for rotary movement toward and away from the rear stationary unit 34. The unit 56 provides a gripping pad 57 having a convex outer surface adapted to nest within the concave inner surface of the stationary gripping pad 35. The pad 57 is substantially the same in form and size as the pad 39.

A link 58 is pivotally secured to the handle crank 50 and to an outwardly extending boss 59 of the unit 56. A stop pin 60 provides an abutment for engagement with the link 58 to determine a limiting over-center "lock" position of the handle 44.

It will be apparent that rotary movement of the bag locking handle 44 about the pivot shaft 42 will serve to carry the pad 57 toward and away from its stationary mating pad 35. In this way, the rear bag holding pad 57 may be moved into nested engagement within the rear stationary bag locking pad 35.

The handle crank 50 serves to pivotally carry a link assembly mounting block 62. The link assembly comprises a rear adjustable link 64 and a forward adjustable link 66. The two links are overlappingly engaged for relative sliding adjustment. The rear link 64 is slotted at 65 to receive a pair of lock screws 67 carried by the forward link 66, thereby enabling adjustable lengthening or shortening of the interconnected links.

The forward link 66 is slotted at 67 to slidably receive therein a pivot rod 68 terminating in a lock nut. The rod 68 is carried by an extended boss portion 70 of a forward bag locking pad 72. An abutment block 74 is carried by the rod 68 and is spacedly opposed by a terminal flange 75 of the forward link 66. A compression spring 76 is mounted between the block 74 and flange 75 to normally dispose the rod 68 at the inner end of the slot 67, as shown in Figure 3.

A pair of pivot support flanges 78 extend from the adjustable supporting block bracket 36 and are apertured to provide a pivot mounting for a supporting rod 80 from which the unit 72 is suspended. A gripping pad 73, similar in shape and form to the rear stationary pad 35, is provided by the unit 72. It will be apparent that the inner concave surface of the pad 73 is adapted to matingly engage the outer convex surface of the adjustable stationary pad 39 in substantially the same manner as the pads 57 and 35, but in reverse geometry. That is, concave pad 73 pivots toward engagement with convex pad 39, whereas convex pad 57 pivots toward concave pad 35.

It will be apparent that as the handle 44 is manually pivoted about the shaft 42, the interconnected adjustable links 64 and 66 will be carried by the handle crank 50 from left to right, as seen in Figures 3 and 4. At the same time, the unit 72 will be pivoted toward and away from the stationary unit 38. The engaging force exerted between the two gripping pads 73 and 39 will be determined by the compression spring 76.

The innermost gripping units 38 and 56 provide integral guide chute surfaces 81 and 82, respectively, to insure directing of downwardly fed produce material entirely into a bag held therebelow. The gripping pad surfaces 35, 57, 39 and 73 are formed of a layer of rough-top belting material cemented to the respective units. In this way a compressible friction surface is provided for gripping various bag materials such as paper, mesh, fabric, and plastic without slippage or risk of tearing.

*Practical operation*

When the gross weighing head of the present invention is mounted in an operative manner upon the scale beam of a produce bagging machine, an operator will be stationed so as to manually control the weighing head. The operator first rotates the bag locking handle 44 toward a pad-open position, or in the clockwise direction as viewed in Figures 3 and 4 of the drawing. The various parts will then be in the position shown in Figure 3. A bag, indicated in phantom outline at B in the drawing, is opened and slipped upwardly by one hand of the operator to a position wherein opposite sides of the bag are disposed between the open mating pairs of gripping pads at opposite sides of the head. While holding the bag with one hand, the operator then rotates the bag locking handle 44 toward a pad-closed position or in the counter-clockwise direction. Closing rotation will be limited by engagement of the stop pin 60 against the link 58 in an over-center "lock" position. The gripping pressure between the pads 73 and 39 will be compensated through the adjustable link assembly and compression spring 76 to provide a gripping force of predetermined magnitude. The bag will then be held securely by the two pairs of mated gripping pads.

When bags of different sizes are to be used, it is merely necessary to adjust the position of the forward bag holding pad 38 and its companion bag locking unit 72 to the desired position relative to the rear bag holding unit 34 and its companion bag holding unit 56 in order to accommodate the particular bag width. Suitable adjustment of the sliding linkage and compression spring will serve to provide a secure gripping force as desired. An alternate hole 83 is provided in the forward link 66 to receive one of the lock nuts 67 for cooperation with the slot 65 of the rear link 64 when extreme shortening is desired for bags of small size.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A gross weighing head for a produce bagging machine, comprising fixed support means adapted to be secured to the scale beam of a weighing mechanism, container gripping means including a spaced pair of stationary members carried by said support means in relatively fixed opposed positions, a pair of members each separately pivotally carried by said support means for movement between spaced and cooperatively engaged positions relative to a corresponding one of said stationary members, and actuator linkage means pivotally connected to each of said members and to said support means for effecting simultaneous movement of said members between their respective spaced and engaged positions.

2. A gross weighing head for a produce bagging machine, comprising fixed support means adapted to be secured to the scale beam of a weighing mechanism, container gripping means including a spaced pair of stationary gripping members carried by said support means in relatively fixed opposed positions, a pair of gripping members each pivotally carried by said support means for movement toward and away from a corresponding one of said stationary gripping members, each pair of engagingly cooperating gripping members being of complementary curved form for corresponding nested interengagement, and actuator linkage means pivotally connected to each of said members and to said support means for effecting simultaneous movement of said members between their respective spaced and tightly engaged positions relative to the corresponding stationary members.

3. A gross weighing head for a produce bagging machine, comprising fixed support means adapted to be secured to the scale beam of a weighing mechanism, container gripping means comprising rear and forward pairs of gripping members, said rear pair including a locking member fixedly carried by said support means and a holding member pivotally carried by said support means, said forward pair including a holding member fixedly carried by said support means in predetermined spaced relation to said rear locking member and a locking member pivotally carried by said support means, first linkage means between said rear holding member and said support means, second linkage means between said first linkage means and said forward locking member, and actuator means for operating said linkages to effect simultaneous movement of said rear and forward members in the same direction between spaced and engaged positions relative to the corresponding fixed members.

4. A gross weighing head for a produce bagging machine, comprising fixed support means adapted to be secured to the scale beam of a weighing mechanism, container gripping means comprising rear and forward pairs of gripping members, said rear pair including a stationary locking member fixedly carried by said support means and a holding member pivotally carried by said support means, said forward pair including an adjustably fixed holding member carried by said support means for selective spaced positioning relative to said rear locking member and a locking member pivotally carried by said support means, first linkage means between said rear holding member and said support means, second linkage means between said first linkage means and said forward locking member, said second linkage means being adjustable in effective length to accommodate adjusting movements of said forward adjustable holding member, and actuator means for operating said linkages to effect simultaneous movement of said rear and forward members in the same direction between spaced and engaged positions relative to the corresponding fixed and adjustably fixed members.

5. A gross weighing head for a produce bagging machine, comprising fixed support means adapted to be secured to the scale beam of a weighing mechanism, container gripping means comprising rear and forward pairs of gripping members, said rear pair including a locking member fixedly carried by said support means and a holding member pivotally carried by said support means, said forward pair including a holding member fixedly carried by said support means in predetermined spaced relation to said rear locking member and a locking member pivotally carried by said support means, first linkage means between said rear holding member and said support means, second linkage means between said first linkage means and said forward locking member, said second linkage means being connected to said forward member by means of a spring coupling serving to bias said forward member into tight gripping contact with its corresponding fixed holding member when in engaged position, and actuator means for operating said linkages to effect simultaneous movement of said rear and forward members in the same direction between spaced and engaged positions relative to the corresponding fixed members.

6. A gross weighing head for a produce bagging machine, comprising fixed support means adapted to be secured to the scale beam of a weighing mechanism, container gripping means comprising rear and forward pairs of gripping members, said rear pair including a stationary locking member fixedly carried by said support means and a holding member pivotally carried by said support means, said forward pair including an adjustably fixed holding member carried by said support means for selective spaced positioning relative to said rear locking member and a locking member pivotally carried by said support means, first linkage means between said rear holding member and said support means, second linkage means between said first linkage means and said forward locking member, said second linkage means being connected to said forward member by means of a spring coupling serving to bias said forward member into tight gripping contact with its corresponding fixed holding member when in engaged position, said second linkage means being adjustable in effective length to accommodate adjusting movements of said forward adjustable holding member, and actuator means for operating said linkages to effect simultaneous movement of said rear and forward members in the same direction between spaced and engaged positions relative to the corresponding fixed and adjustably fixed members.

7. A gross weighing head for a produce bagging machine, comprising fixed support means adapted to be secured to the scale beam of a weighing mechanism, container gripping means including a spaced pair of stationary members carried by said support means in relatively fixed opposed positions, a pair of members each separately pivotally carried by said support means for movement between spaced and cooperatively engaged positions relative to a corresponding one of said stationary members, and actuator linkage means pivotally connected to each of said members and to said support means for effecting simultaneous movement of said members between their respective spaced and engaged positions, said actuator linkage including an over-center lock to maintain closed clamping engagement of the container gripping means.

References Cited in the file of this patent

UNITED STATES PATENTS

| | | |
|---|---|---|
| 266,608 | Cooper | Oct. 31, 1882 |
| 889,751 | Bond | June 2, 1908 |
| 1,199,001 | Fellows | Sept. 19, 1916 |
| 2,332,002 | Neuman | Oct. 19, 1943 |